(12) United States Patent
Berger et al.

(10) Patent No.: US 6,722,219 B2
(45) Date of Patent: Apr. 20, 2004

(54) TRANSMISSION, SHIFTABLE IN A TRACK PATTERN

(75) Inventors: Reinhard Berger, Bühl (DE); Marc Hauptmann, Bühl (DE); Michael Gallion, Karlsruhe (DE); Martin Vornehm, Bühl (DE); Martin Zimmermann, Sasbach (DE)

(73) Assignee: LuK Lamellen und Kupplungsbau Beteiligungs KG, Buhl (DE)

( * ) Notice: Subject to any disclaimer, the term of this patent is extended or adjusted under 35 U.S.C. 154(b) by 0 days.

(21) Appl. No.: 10/047,979

(22) Filed: Jan. 14, 2002

(65) Prior Publication Data
US 2002/0108457 A1 Aug. 15, 2002

Related U.S. Application Data

(63) Continuation of application No. PCT/DE00/02255, filed on Jul. 6, 2000.

(30) Foreign Application Priority Data

Jul. 14, 1999 (DE) .......................................... 199 32 754

(51) Int. Cl.[7] ................................................ F16H 59/02
(52) U.S. Cl. ...................................... 74/335; 74/336 R
(58) Field of Search ............................ 74/335, 336 R; 340/456

(56) References Cited

U.S. PATENT DOCUMENTS

| | | | | |
|---|---|---|---|---|
| 4,445,393 A | * | 5/1984 | Braun | 74/335 |
| 4,702,127 A | * | 10/1987 | Cote | 74/335 |
| 5,856,618 A | | 1/1999 | Beishline | 73/118.1 |
| 5,875,679 A | * | 3/1999 | Salecker et al. | 74/335 |
| 6,056,669 A | * | 5/2000 | Marshall | 74/335 |
| 6,073,509 A | * | 6/2000 | Salecker et al. | 74/335 |

FOREIGN PATENT DOCUMENTS

| | | |
|---|---|---|
| DE | 44 47 512 A1 | 3/1996 |
| DE | 198 23 050 A1 | 3/1998 |

\* cited by examiner

*Primary Examiner*—Ha Ho
(74) *Attorney, Agent, or Firm*—Darby & Darby

(57) ABSTRACT

A motor vehicle transmission is shiftable in a track pattern with a selector track and shift tracks. A shifter element moves along the tracks when the transmission is shifted from one gear ratio to another. The shifts are directed by a control device sending command signals to an actuator device which, in turn, applies an actuating force to the transmission. A main position-detecting device detects the position of the shifter element relative to the selector track and shift tracks, and a redundant position-detecting device performs an additional, redundant determination of the shifter-element position.

69 Claims, 12 Drawing Sheets

First shifter element movable along selector and shifter tracks

TRANSMISSION, SHIFTABLE IN A TRACK PATTERN

CROSS-REFERENCE TO RELATED APPLICATION

This application is a continuation of International Patent Application Serial No. PCT/DE00/02255, filed Jul. 6, 2000, published in German, which is hereby incorporated by reference in its entirety.

BACKGROUND OF THE INVENTION

The invention relates to a transmission including devices for controlling and actuating the transmission, as well as a method of operating the transmission.

A transmission in the sense of the present invention is a mechanism that can be shifted in steps or in a continuous, step-less range into different shift positions corresponding to different transmission ratios between two shafts of the transmission. The transmission can be configured as a gear-shifting transmission or a cone-pulley system, or any other transmission that may benefit from the present invention. The transmission can be shifted automatically or manually, or in a partially automatic or automated mode with the possibility of manual intervention. Depending on the design of the transmission, the shifts from one shift position to another may or may not cause an interruption in vehicle traction.

A transmission in the sense of the present invention is configured in particular as an automatic transmission or as an automated shift transmission.

An automatic transmission in the present context is a transmission in which the shifts are controlled automatically and occur without interruption in the tractive force. The term "automatic transmission" in the present context specifically refers to transmissions with a planetary gear mechanism.

The term "automated shift transmission" relates to a transmission that allows automated shifting between different shift positions and is characterized by an interruption in vehicle traction during the shift processes. The automated shift transmission can be equipped with at least one electric motor to actuate the shift movements.

The term "shift transmission" as used in the present context generally relates to a transmission with a track pattern, i.e., a shift pattern with at least one selector track and several shift tracks, with a first shifter element such as a shift finger that is movable along the tracks.

In the context of the present invention, a selector track or shift track can be a physically existing track or a virtual track.

The term "virtual track" refers to an arrangement where a control device or an actuator device generates signals that allow the first shifter element to move or be moved only along certain track-like paths.

A shift track in the sense of the present invention consists either of one branch that runs in one direction essentially from a defined position on the selector track, or two branches that run in opposite directions from a selector position on the selector track. Movement along a shift track brings the first shifter element to a predetermined position in which a predetermined gear level or a predetermined transfer ratio of the transmission is engaged.

A transmission in the sense of the present invention is equipped with an actuator device, i.e., a device that can apply a force to at least one shifter element that is part of a shift mechanism, so that the shifter element is moved in predetermined ways to shift the transmission into different shift positions.

The actuator mechanism contains in particular at least one electric motor. A preferred arrangement has a first motor used as a selector motor to move the first shifter element along the selector track, and a second motor used as a shifter motor to move the first shifter element in the direction of the shift tracks.

A transmission includes a control device which transmits control commands and/or supplies power to the actuator device. The control commands or the power transmitted from the control device determine the nature, timing, duration, direction and intensity of the action to be exerted by the actuator device on the first shifter element. The control command signals can control the actuator device alone, or they can also control a further device such as a clutch, more specifically an automated clutch device. With preference, the signals transmitted from the control device to the actuator device are in the form of electric currents or voltages.

A transmission in the context of the present invention is also equipped with a position-detecting device.

A position-detecting device is a device that can detect a position or a change in position in absolute or relative terms. In particular, the position-detecting device can measure a travel distance or an angle of rotation or a change in distance or angle from one point in time to another.

The position-detecting device can be based on a principle of absolute or relative measurement. The position-detecting device is configured in particular as an incremental position sensor or an angle-detection sensor.

Preferably, an incremental angle-detection sensor is arranged on an electric motor, specifically the aforementioned shifter motor or selector motor.

Automated shift transmissions are known in which a control device transmits output signals in the form of electric voltages to a selector motor and a shifter motor. The signals can have the effect that the selector and shifter motors actuate a shifter shaft which, in turn, causes shift processes to be performed in the transmission. In a transmission of this kind, incremental displacement sensors are arranged at the selector motor and shifter motor to detect position changes and thereby determine the current shift position of the transmission.

The transmissions of the foregoing description are proven in practical use.

Nevertheless, there have been instances of malfunctions in transmissions of this kind. In particular, the malfunctions were related to the gear-shifting process, causing in some cases damage to the transmission, loss of driving comfort in the vehicle equipped with the transmission, or dangerous traffic situations.

OBJECT OF THE INVENTION

The present invention therefore has the objective of providing a transmission, a control device for controlling the transmission, as well as a method of operating the transmission with the purpose of improving operating safety in a simple and cost-effective way and also offering the possibility of improved driving comfort.

SUMMARY OF THE INVENTION

To meet the foregoing objective, the invention proposes a transmission with one or more first shifter elements movable in a track pattern with a selector track and shift tracks and one or more second movable shifter elements. Moving the first and/or second shifter element will set the transmission into different shift positions.

The transmission according to the invention further includes: an actuator device which acts on at least one of the shifter elements, a main position-detecting device to detect the position of one of the movable shifter elements in the directions of the selector track and shift track, and at least one redundant position-detecting device, which can under certain predetermined conditions detect the position of one of the movable shifter elements.

In short, the invention proposes a transmission with a main position-detecting device as well as a redundant position-detecting device.

The main position-detecting device within the context of the present invention is in particular a primary position-detecting device not restricted to any specific configuration.

The shifter mechanism that is part of the transmission has a first shifter element movable in a track pattern, and also a second movable shifter element. Moving at least one of the shifter elements will set the transmission into different shift positions. Specifically, the first shifter element takes the form of a so-called shifter finger, and the second shifter element takes the form of a so-called shifter shaft.

The main position-detecting device, configured in particular as an incremental sensor device, is designed to detect the position of a movable shifter element with regard to the directions of selecting and shifting, i.e., the two coordinates of movement along the selector track and shift tracks.

According to a preferred embodiment of the invention, the main position-detecting device indicates the position with a higher degree of accuracy than the redundant position-detecting device.

The invention shows a way to avoid a continuing use of erroneously detected position data and thereby avoid the risk that the control device will generate erroneous output signals based on the faulty detection data. Furthermore, driving comfort can be improved in a vehicle equipped with the transmission according to the invention.

Preferably, the redundant position-detecting device includes a sensor device capable of generating a sensor signal that is indicative of the position of at least one shifter element, e.g., the first shifter element, and can be transmitted to the control device.

The sensor device can be an electromechanical contact sensor, a Hall-effect sensor, an inductive sensor, an optical sensor, a capacitative sensor, an acoustical sensor, or an electrical slider contact cooperating with conductive tracks, or any other suitable device.

Preferably, the sensor device is based on a digital concept, so that it provides a digital signal. The digital signal indicates whether a predetermined movable shifter element such as the aforementioned first or second or another shifter element of the transmission is positioned in a first or second range of possible shift positions. The first and second range can themselves be subdivided into partial ranges that may be adjacent to each other or spatially separated from each other.

With preference, the sensor device is configured with at least three steps, so that the sensor device can generate a distinctive sensor signal in each of the three steps to indicate the range of shift positions where the shifter element is currently located. The sensor output signals for different shift positions can be identical or different from each other.

The sensor device may work in a continuous, step-less range or in steps, indicating the shift positions of the transmission in discrete steps or in a continuous, analog format.

According to a preferred embodiment of the invention, at least a part of the shift positions that the transmission device or a shifter element can be set to is associated with corresponding positions of a field, a field-like area, or a curve profile or surface profile.

The preferred embodiments of the present invention will be presented schematically, using the concept of the field, field-like area, or surface profile. Each of the embodiments according to the invention can comprise a field as well as a field-like area, or also a surface profile.

A field in the sense of the present invention exists either as a material or non-material field in one, two, three or more dimensions. The term "field" in the present context means one or more physical quantities that vary as a function of location, i.e., of the spatial coordinates in an area where the field is defined. If the field is defined by more than one variable physical quantity, such quantities may or may not be dependent on each other.

With preference, at least one shifter element of the transmission is subjected to a field, with predetermined shift positions of the shifter element being assigned to predetermined field locations.

The field can in particular consist of an acceleration field, or an electrical, magnetic, or other kind of field.

A preferred kind of field in the sense of the present invention consists of a surface profile arranged in particular on the surface of the second shifter element. The profile has raised and depressed portions.

The surface profile is preferably configured in a manner where different points of the surface have different distances from the longitudinal axis of the second shifter element.

Preferably, the field has the effect that the movement of one of the shifter elements is opposed or assisted by a variable force.

A field in the sense of the present invention is preferably a potential field in which different positions are associated with different levels of potential energy. Preferably, the potential field is a force field. Further within the scope of the present invention, the term "field" can also mean a signal field in which different signals are generated by way of a field-sensing element or contact element that connects to different positions of the signal field. The signals are generated either by the field itself or by the field-sensing element.

The different signals are generated in particular by an arrangement where a spring-biased feeler element follows a surface profile on the second shifter element so that the compressive spring force varies as the feeler element moves over raised and depressed profile portions.

A field-sensing element in the sense of the present invention can be any element that has a connection to different locations of the field.

A connection between a field and a field-sensing element in the sense of the present invention means that the field-sensing element relates to a predetermined field location, with or without physical contact between the field-sensing element and the field location, so that the field-sensing element can in particular detect and transmit an attribute of the field location, such as a characteristic value. With preference, the field-sensing element communicates in each case with the field location that is situated in relation to the field-sensing element according to a predetermined characteristic.

The signal field is configured in particular as a binary signal field, meaning that the signal generated by the field alone or in cooperation with the field-sensing element can take on two different values.

Preferably, the redundant position-detecting device makes use of the field in order to determine the shift position of the transmission.

Also with preference, the redundant position-detecting device includes or is connected to a sensor device and/or a computer device. The sensor/computer device determines a field location and/or characteristic values of the field location according to a predetermined characteristic. Based on a correlation characteristic, the field location allows conclusions to be drawn with regard to the shift position of the transmission.

The field-sensing element is preferably part of an arrangement in the form of a retainer or holder containing the field-sensing element as well as a switch and/or sensor or the like. The switch/sensor can respond to or communicate with different positions of the field and will therefore also be referred to herein as a position transducer.

The position transducer can in particular be designed to detect a translatory movement of the field-sensing element as the latter follows the surface profile or other variable of the field.

The position transducer preferably generates a switch signal that is indicative of the shift position and/or a domain or delimited portion out of the overall range of shift movements. The term "shift positions" specifically refers to predetermined positions of the gears or synchronizer elements or to a neutral position of the transmission.

The switch output signal is transmitted preferably to the control device or the actuator device. With preference, the control device takes the switch output signal into account when outputting command signals. With particular preference, the control device generates output command signals by taking into account the switch signal as well as signals of a primary position-detecting device, all of which are indicative of the current shift position of the transmission.

With preference, the surface profile of the second shifter element is configured so that a predetermined level of potential energy is assigned to each gear position and the neutral position of the transmission; and/or a predetermined level of potential energy is assigned to the selector track and each shift track.

The surface profile representing the level of potential energy is preferable measured or detected by a contact sensor or a field-sensing element that is part of the redundant position-detecting device. The level of potential energy is determined in particular by the distance of each surface point from the central axis of the second shifter element.

According to a preferred embodiment of the invention, at least one predetermined shift position such as a gear position or the neutral position or a track of the shift pattern is associated with a local extreme of the potential energy or of the surface profile. When the sensor or field-sensing element detects the local extreme value, this can be taken as an indication that the transmission is in the shift position associated with the local extreme.

Preferably, the field-sensing element is a sphere or spherical contact head that is spring-biased against a profiled surface, or the field-sensing element may be based on a non-contacting sensor principle.

According to a preferred embodiment of the invention, the field is configured so that the transmission has a tendency to move towards a local minimum of the potential energy even in the absence of a command signal from the control device, or without an actuator force being applied. In particular, the second shifter element can be arranged and configured so that it will seek a position where the energy stored in the biasing spring of a field-sensing element bearing against a surface profile of the second shifter element is minimized, i.e., a position where the field-sensing element bears against an area of minimum distance between the surface and the central axis of the second shifter element.

Preferably, the field is a scalar field or a vector field.

The field can be variable or invariable over time. A variable field may depend in particular on characteristic operating values of the motor vehicle or its constituent devices, which may change during the operation of the vehicle.

According to a preferred embodiment of the invention, the field or, more specifically, the field-like area or surface profile of the second shifter element correlates to a signal pattern which could be interpreted as a projection or a transformed image of the field that is overlaid on the track pattern of a selector track and shift tracks. The signal pattern is composed of different domains. A predetermined signal value is assigned to each domain, so that different signal values are generated depending on which domain the first shifter element is positioned in at a given time.

The signals associated with the different domains are at least in part different from each other. Preferably, there are two or three different signals assigned to the different domains.

The signal pattern is preferably used to determine which of the tracks of the shift pattern the first shifter element is positioned in at a given time.

With particular preference, the signal pattern is used to detect a movement of the first shifter element from a predetermined track to another predetermined track or from a predetermined gear position to another predetermined gear position. Preferably, the signal or signal value does not change within a domain.

According to a preferred embodiment of the invention, the signals that are associated with the domains of the signal pattern are used to determine which of the tracks the first shifter element is currently positioned in;

whether the first shifter element is being moved from one predetermined track to another predetermined track;

whether the shifter element is being moved from a predetermined gear position to another predetermined gear position;

which of the gear levels is currently engaged.

The foregoing determination is made preferably on the basis of the number of signal changes that are detected in the course of a movement of the first shifter element and/or on the basis of the signal values that are assigned to the different domains of the signal pattern.

In a preferred embodiment of the invention, the field is used to determine when the transmission is in a position of synchronized gear engagement.

The domains of the signal pattern are preferably configured or arranged in such a way that at least one boundary between adjacent domains runs either parallel or perpendicular to a track of the shift pattern.

Preferably, a domain of the signal pattern covers the entire width of the track in which at least most of that domain is arranged.

A change in the signal detected by the sensor device occurs preferably when the first shifter element moves across a boundary between adjacent domains of the signal pattern. Preferably, the change consists of a jump from one signal state to another.

According to a preferred embodiment of the invention, the domains of the signal pattern are arranged in a chessboard-like configuration.

Preferably, the transmission is equipped with a computing device in which the topography of the signal pattern is stored. Based on the stored topographical data and the detected sensor signals, the computing device determines whether or when the first shifter element is moving to a different track of the shift pattern or the transmission is being shifted from one gear level to another.

With preference, the redundant position-detecting device has the capability of distinguishing certain predetermined shift positions of the transmission from other shift positions. Specifically, the distinctive shift positions include the fully engaged gear positions and/or the neutral position of the transmission.

According to a preferred embodiment of the invention, a movement of a first shifter element across a boundary between adjacent domains of the signal pattern is detected from the dynamic behavior of a predetermined characteristic operating value.

The characteristic operating value is in particular an electric current that is transmitted from the control device to an electric motor such as the selector motor or shifter motor.

With preference, the field or the surface profile is configured in such a way that the characteristic operating value, specifically the aforementioned electric current, undergoes a change, for example a jump from one level to another, at the time when the first shifter element is moved across a boundary between adjacent domains of the signal pattern.

Preferably, the field or profile on the second shifter element is configured in such a way that it has field portions in which a movement of the first shifter element is opposed by an essentially constant amount of resistance. In particular, the field or profile is shaped so that adjacent field portions are distinguished by different slope angles of the surface profile, but the slope angle inside each field portion is constant. The projections of the field portions coincide essentially with the domains of the signal pattern. Preferably, the electric current supplied to the selector motor and/or shifter motor by the control device is of a constant magnitude within a given field portion. Thus, an essentially jump-like change of the current will be detected at the transition from one field portion to another, which can be used as an indication that the shifter finger has crossed the boundary between adjacent domains of the signal pattern.

Preferably, the control device receives signals from the primary position-detecting device as well as the redundant position-detecting device to indicate the shift position of the transmission. The control device evaluates the signals for plausibility.

The invention proposes in particular for the case where the primary and redundant position-detecting devices are functioning correctly and their signals confirm each other, that the control device will control the transmission according to a normal operating mode, i.e., that the control device will generate output signals to the transmission in accordance with a normal operating characteristic.

In a particular embodiment of the invention, the system is shut down and/or a process of stopping the motor vehicle is initiated, if the primary and/or the redundant position-detecting device gives a faulty indication of the shift position. A predetermined characteristic can be used to detect whether the values furnished by one or both of the position-detecting devices are faulty. A condition where the primary position-detecting device is functional and the redundant position-detecting device is functionally impaired manifests itself in particular by the fact that the two position-detecting devices give different indications for the shift positions. In this case, a warning signal is generated to bring the malfunction to the attention of the driver of the vehicle.

If a condition is detected where the primary position-detecting device gives a faulty indication of the shift positions and the redundant position-detecting device gives a correct indication, the invention proposes with preference that the control device generate output signals according to a predetermined substitute characteristic. The substitute characteristic is designed to allow only shift processes that are compatible with the movement of the vehicle. In particular, shifts into certain predetermined gears are avoided.

The layout of the domains and/or domain boundaries of the signal pattern is designed preferably in accordance with the movement of the first and/or second shifter element. As a particular feature of the invention, the second shifter element is designed with a surface profile that is contacted by a spring-biased field-sensing element or feeler element. A switch in the signal from one state to another occurs when the feeler element is at a predetermined contour level of the surface profile, corresponding to a predetermined level of potential elastic energy of the biasing spring of the feeler element. As a particular feature, the direction is taken into account in which the threshold of the energy potential is crossed. In other words, a signal change is triggered if the second shifter element is in a position and moves in a way where the energy threshold is crossed in the direction from a higher to a lower potential, i.e., to an area of the surface profile closer to the central axis of the second shifter element. Alternatively, the signal change could also be triggered if the energy threshold is crossed in the direction from a lower to a higher potential energy.

The scope of the invention also includes a control device which performs the control functions required to operate the transmission according to the invention. The control device issues output signals in the form of commands to an actuator device that actuates the shift movements of the transmission according to a predetermined characteristic.

Also included in the scope of the invention are methods of operating a motor vehicle including a step of utilizing the transmission according to the invention, as well as methods including a step of utilizing a control device performing the control functions required to operate the inventive transmission.

The invention further proposes a method of shifting a transmission from a currently engaged gear level to a new gear level. The shift is actuated by a shift motor and a selector motor according to a predetermined characteristic. In the course of the shift process, the signals of a sensor device of the redundant position-detecting device are monitored and analyzed to determine the position of the first shifter element in relation to the track pattern. The shift from a given current gear to a given new gear determines a specific number of signal changes or a specific sequence of signals that will occur in the course of the shift process. Under the inventive method, the shift and/or actuator motor are activated dependent on the detected signals or signal changes.

As a linguistic formality, where the names of features are connected by the word "or", this should be understood in the broadest sense, i.e., either as a logic type of "or" (meaning "one or the other or both") or an exclusive or (meaning "one or the other but not both"), whichever fits the context.

The terms "control" and "regulation" and their derivatives are used herein with a broad range of meanings encompassing closed-loop as well as open-loop control of devices, functions and processes, including in particular the DIN (Deutsche Industrie-Norm) definitions for regulation and/or control).

The novel features that are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawing.

BRIEF DESCRIPTION OF THE DRAWINGS

Embodiments of the invention are described below as examples only, and no limitations are thereby implied. The description refers to the attached drawings, wherein.

DETAILED DESCRIPTION OF THE INVENTION

Figure 1:
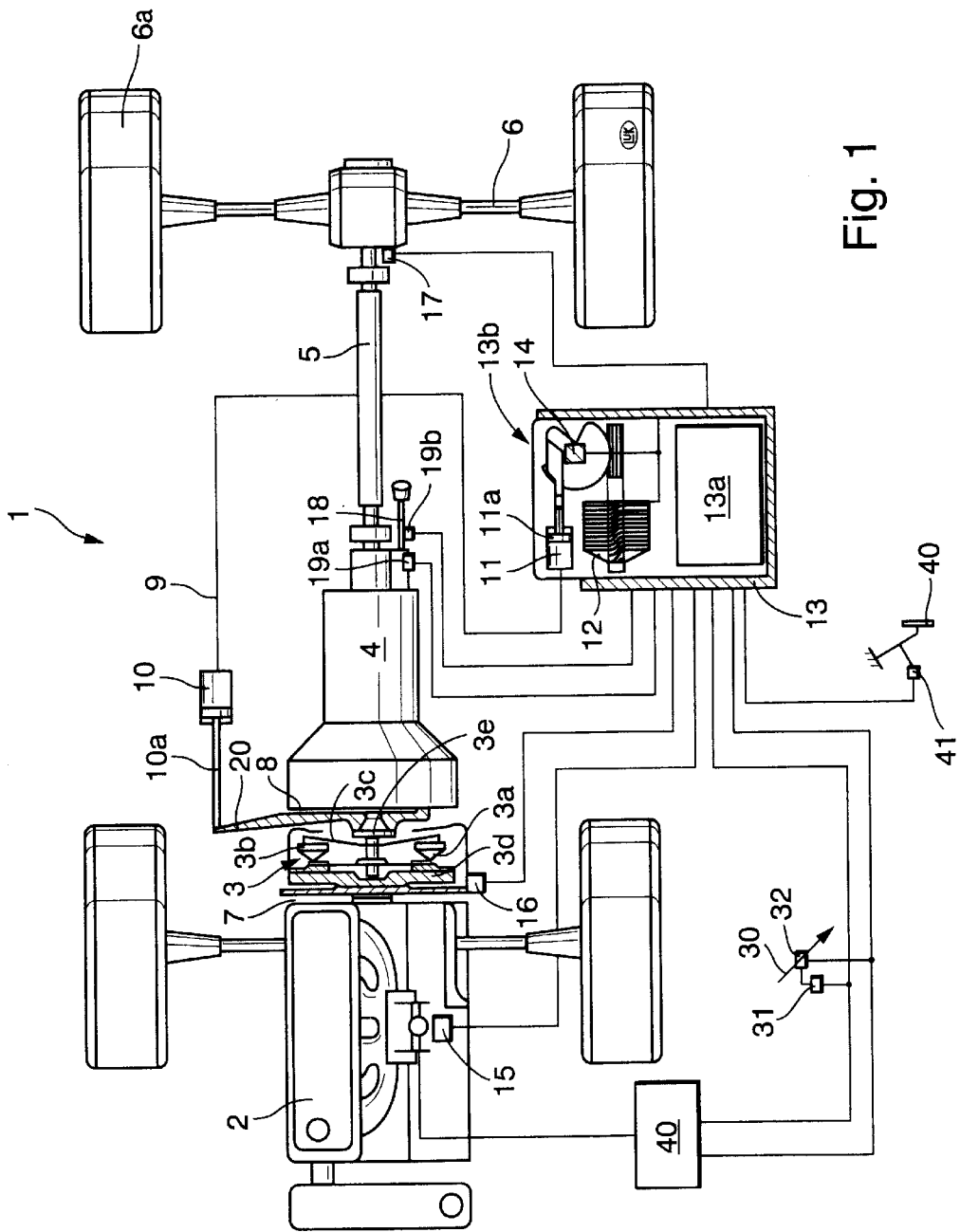
FIG. 1 represents a first exemplary embodiment of the invention in a schematic view.

FIG. 1 gives a schematic view of a vehicle 1 with a drive unit 2 such as a motor or combustion engine. The power train of the vehicle further contains a torque-transmitting device 3 and a transmission 4. The illustrated example shows the torque-transmitting device 3 arranged in the torque flow path between the engine and the transmission, so that the driving torque generated by the engine is passed on by way of the torque-transmitting device 3, the transmission 4, the drive shaft 5, and the driving axle 6 to the wheels 6a.

The torque-transmitting device 3 is configured as a clutch, such as a friction clutch, laminar disc clutch, magnet powder clutch, or converter bypass clutch. The clutch may be of the self-adjusting, wear-compensating type. The transmission 4 is shown as a manual shift transmission in which the transmission ratio is changed in steps. However, under the concept of the invention, the transmission may also be an automated shift transmission in which the shifting process is automated by means of at least one actuator. The term "automated shift transmission" further means an automated transmission of a type where the tractive force is interrupted during gear shifts and where the shifting from one transmission ratio to another is performed by means of at least one actuator.

It is also possible to use a conventional automatic transmission of the type that works without interrupting traction during gear shifts and is normally based on planetary gear stages.

As a further possibility, a transmission with a continuously variable transfer ratio, such as for example a cone-pulley transmission, may be employed in embodiments of the invention. If a conventional automatic transmission is used, the latter may be equipped with a torque-transmitting device 3, e.g., a clutch or friction clutch, arranged at the output side of the transmission. The torque-transmitting device can further be configured as a start-up clutch and/or as a reverse-gear clutch and/or as a safety clutch in which the magnitude of the transmittable torque can be controlled at a targeted level. The torque-transmitting device can be a dry friction clutch, or a so-called wet-running friction clutch that runs in a fluid, or it may consist of a torque converter.

The torque-transmitting device 3 has an input side 7 and an output side 8. A torque is transmitted from the input side 7 to the output side 8 through a contact force that is applied to the clutch disc 3a by means of the pressure plate 3b, the diaphragm spring 3c, the release bearing 3e, and the flywheel 3d. The force is generated by an actuator pushing or pulling the release lever 20.

The torque-transmitting device 3 is controlled by means of a control unit 13 which may be configured as a control device with an electronic module 13a and an actuator 13b. In another advantageous embodiment, the actuator and the electronic module may also be accommodated in two separate subassembly units or housings.

The control unit 13 may contain the electronic circuits for the control as well as for the power supply of the electric motor 12 of the actuator 13b. This has the advantage that only one compact portion of space is needed for both the actuator and the electronics. The actuator consists of a motor 12, typically an electric motor driving a hydraulic master cylinder 11 through a gear mechanism such as a worm gear mechanism, a spur gear mechanism, a crank mechanism, or a threaded spindle mechanism. The master cylinder may be driven directly or by way of a rod linkage.

The movement of the output element of the actuator, i.e., of the piston 11a of the master cylinder 11, is detected by a clutch travel sensor 14 which senses a position, or the speed or acceleration of a change in position of an element whose displacement, speed or acceleration is in direct proportion to the displacement, speed or acceleration of the clutch. The master cylinder 11 is connected through a pressure conduit 9, normally a hydraulic line, to the slave cylinder 10. The output element 10a of the slave cylinder is coupled to the release lever or release element 20. Thus, a movement of the output element 10a of the slave cylinder 10 causes the release element 20 to be moved or tilted to effect a controlled variation of the amount of torque that is transmitted by the clutch 3.

The actuator 13b that controls the torque-transmitting device 3 may be based on a pressure-propagation principle, using a master cylinder and slave cylinder communicating through a pressure medium. The pressure medium can be a hydraulic fluid or a pneumatic medium. The master cylinder may be driven by an electric motor 12 that is electronically controlled. However, instead of an electric motor, the driving element of the actuator 13b may also be based on another drive source, e.g., driven by hydraulic pressure. It is also conceivable to use magnet-based actuators to set a position of an element.

The amount of torque transmitted through a friction clutch is controlled to a targeted level by applying pressure on the friction linings of the clutch disc between the flywheel 3d and the pressure plate 3b. The force that is exerted on the pressure plate and on the friction linings is controlled by the position of the release element 20, whereby the pressure plate is moved to or set and held at any position between two end positions. One end position represents a fully engaged condition of the clutch, and the other end position represents a fully disengaged condition. To set the transmittable torque at an amount that is less than the current engine torque, the pressure plate 3b is moved to a position that lies in an intermediate range between the end positions. By controlling the release element 20 to a set target, the clutch can be held at the targeted position. However, it is also possible to set the transmittable torque above the level of the current engine torque. In this case, the torque generated by the engine is passed on by the clutch while torque fluctuations, especially abrupt peaks in the torque flow, are damped and/or isolated.

The control and regulation of the torque-transmitting device further relies on sensors which at least part of the time monitor the relevant factors and provide the status data, signals and measurement values that are necessary for the control and are processed by the control unit. The latter may also have communication lines to other electronic units such as, e.g., an electronic engine control unit, or an electronic control of the anti-lock braking system (ABS), or an anti-slip regulation (ASR). The sensors detect, for example, rpm rates of the vehicle wheels or of the engine, the position of the gas pedal, the position of the throttle valve, the currently engaged gear level of the transmission, driver-generated inputs that indicate an impending gear change, and other characteristic information specific to the vehicle and the operating situation.

FIG. 1 shows a throttle valve sensor 15, an engine rpm sensor 16, as well as a vehicle speed sensor 17, which relay measurement data and information to the control device. The electronic unit, such as a computer unit that is part of the control unit 13a, is processing the incoming data and issues control commands to the actuator 13b.

The transmission is configured as a step-shifting transmission, in which the transmission ratio is shifted in discrete, fixed steps by means of a shift lever. The shift lever may operate or actuate the transmission directly. There is further at least one sensor 19b arranged at the shift lever 18 of the manual shift transmission, which serves to detect when the driver intends to shift gears and/or which gear is currently engaged, and to relay the information to the control device. The sensor 19a is connected to the transmission and serves to detect the currently engaged gear of the transmission and/or to detect a condition that indicates that the driver is about to shift gears. The detection of the driver's intent to shift gears can be realized through the use of at least one of the sensors 19a, 19b, if the sensor is a force sensor that responds to a force acting on the shift lever. Alternatively, the sensor could also be a position sensor or displacement sensor, in which case the control unit would recognize an intent to shift gears from a dynamic change of the position signal.

The control device is at least part of the time in signal communication with all of the sensors and evaluates the sensor signals and input data which, in their totality, are referred to as the current operating point of the torque transfer system. Based on the operating point, the control device issues control and regulation command signals to the at least one actuator. The drive element 12 of the actuator, such as an electric motor, operates under the command of the control unit that controls the actuation of the clutch by means of a command signal that depends on the measurement values and/or the system input data and/or signals of the sensors. The control device has a control program in the form of hardware and/or software, which evaluates the incoming signals and calculates or determines the output quantities based on comparisons and/or functions and/or characteristic data arrays or curve fields.

The control unit 13 is advantageously equipped with units or modules for the determination of torques, gear positions of the transmission, amounts of slippage in the clutch, and/or different operating states of the vehicle, or there are signal connections from the control unit 13 to at least one of the aforementioned modules. The modules or units may be implemented in the form of control programs in hardware and/or software. As a result, the incoming sensor signals allow a determination of the torque of the drive unit 2 of the vehicle 1, the gear position of the transmission 4, the amount of slippage in the torque-transmitting device, as well as the current operating state of the vehicle. The gear-position determining unit detects which gear is currently engaged based on the signals from the sensors 19a and 19b. The sensors are coupled to the shift lever and/or to internal mechanical elements of the transmission such as, e.g., a central shifting shaft or shifting rod, to detect the position or movement of these elements. There can further be a gas pedal sensor 31 arranged at the gas pedal 30 to detect the position of the latter. A further sensor 32 may consist of a binary on/off switch to indicate when the engine is idling, i.e., the switch 32 is on when the gas pedal is not being depressed, and it is off when the gas pedal is being actuated. The gas pedal sensor 31, in contrast to the on/off switch 32, provides a quantitative signal representing the degree of actuation of the gas pedal.

Further in FIG. 1, a brake-actuating element 40 is shown which serves to apply the service brake or the parking brake. This can be a brake pedal, a hand-brake lever, or a hand- or foot-operated actuating element of the parking brake. At least one sensor 41 is arranged at the actuating element 40 to monitor the actuation of the latter. The sensor 41 may be a digital sensor, e.g., a binary switch for detecting whether the actuating element is in an applied or non-applied state. This sensor may be connected to a signal device such as a brake indicator light to alert the driver that the brake is applied. This arrangement can be used for the service brake as well as for the parking brake. However, the sensor can also be configured as an analog sensor, e.g., as a potentiometer that measures the degree of displacement of the actuating element. This sensor, likewise, can be connected to an indicator signal.

Figure 2:
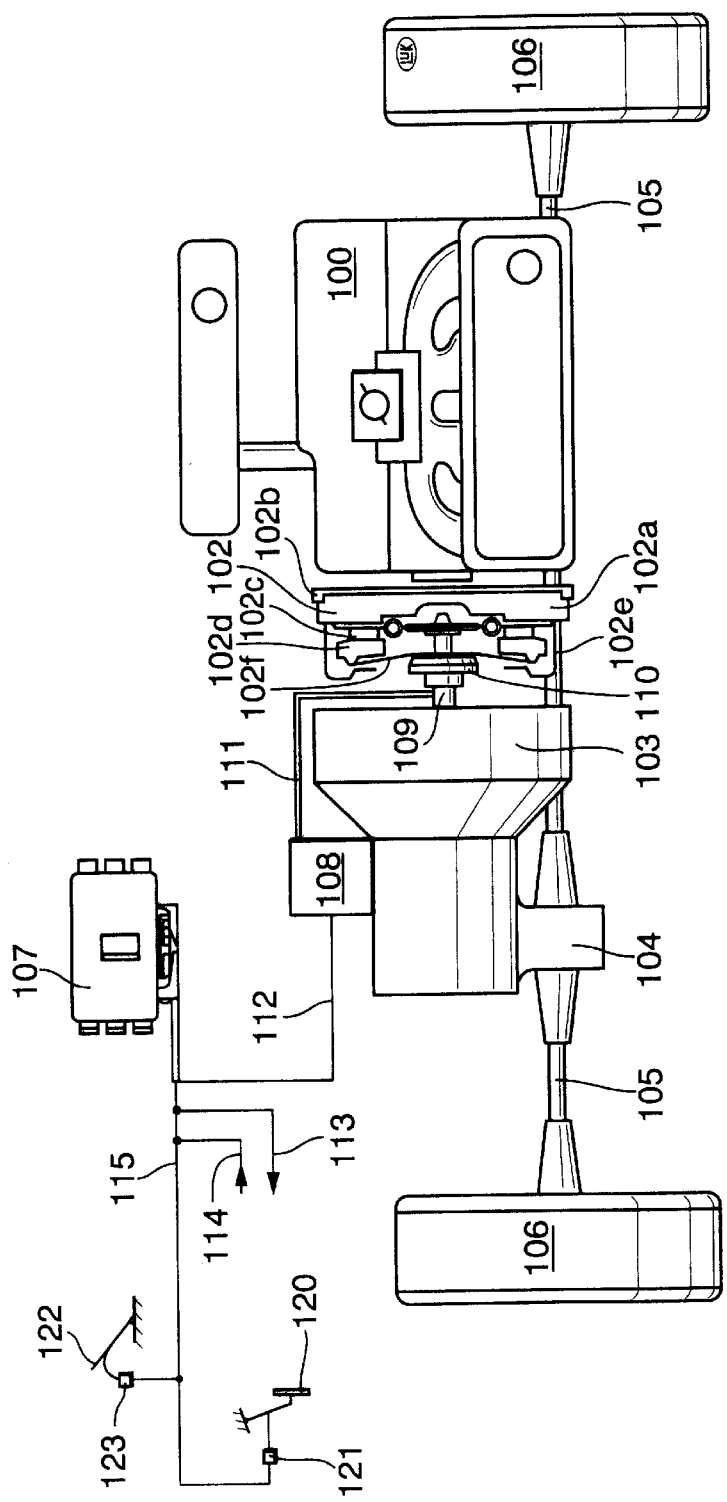
FIG. 2 represents a second exemplary embodiment of the invention in a schematic view.

FIG. 2 gives a schematic view of a power train of a motor vehicle with a drive unit 100, a torque-transmitting device 102, a transmission 103, a differential 104, drive axles 105, and wheels 106. The torque-transmitting device 102 is arranged at or connected to a flywheel 102*a*. The latter as a rule carries an external tooth profile 102*b* that serves to start the engine. The torque-transmitting device has a pressure plate 102*d*, a clutch cover 102*e*, a diaphragm spring 102*f*, and a clutch disc 102*c* with friction linings. The clutch disc 102*c* is interposed between the pressure plate 102*d* and the flywheel 102*a* and may be equipped with a damping device. An energy-storing device such as a diaphragm spring 102*f* pushes the pressure plate axially towards the clutch disc. A clutch-actuating element 109 such as a hydraulically actuated concentric slave cylinder is used to actuate the torque-transmitting device. A release bearing 110 is arranged between the concentric slave cylinder and the prongs of the diaphragm spring 102*f*. As the release bearing is moved along the axial direction, it pushes against the diaphragm spring and thereby disengages the clutch. The clutch may be configured either as a push-actuated clutch or a pull-actuated clutch.

The actuator module 108 belongs to an automated shift transmission and includes the actuator unit for the torque-transmitting device. The actuator module 108 operates internal shifter elements such as, e.g., a shift-actuating cylinder or a rod mechanism, or a central shifter shaft of the transmission. The actuation may work in a manner where the gears can be engaged and disengaged in sequential order or in an arbitrary order. The clutch-actuating element 109 is operated by way of the connection 111. The control unit 107 is connected to the actuator through the signal line 112. The control unit 107 is further connected by signal lines 113 to 115. The signal line 114 carries incoming signals. The line 113 carries command signals issued by the control unit. The connection 115, consisting for example of a data bus, exchanges signals with other electronic units.

To put the vehicle in motion or to accelerate the vehicle from a stationary or slow rolling condition, the driver has to use only the gas pedal 30, as the controlled or regulated automatic clutch actuation controls the amount of transmittable torque of the torque-transmitting device. The degree of depression of the gas pedal is detected by the gas pedal sensor 31, and the control unit will accordingly implement a more or less forceful or rapid start-up acceleration. The sensor signals from the gas pedal are used as inputs for the control of the start-up phase of the vehicle.

In a start-up phase, the amount of transmittable torque is set as a control target by means of a given function or on the basis of characteristic curves or curve fields that may be functions of the engine rpm rate. The latter may in turn be dependent on other quantities, for example on the engine torque, that are correlated to the engine rpm rate through a characteristic relationship.

In a start-up process, essentially from a stationary or crawl-speed condition, if the gas pedal is actuated by an amount a, the engine control 40 will direct the engine to generate an engine torque of a certain magnitude. The control unit of the automated clutch actuation 13 controls the transmittable torque of the torque-transmitting device in accordance with given functions or characteristic curve fields, so that a stationary equilibrium sets in between the engine torque and the clutch torque. The equilibrium is characterized dependent on the amount of gas pedal displacement by a specific start-up rpm rate, a start-up torque generated by the engine, a specific amount of transmittable torque of the torque-transmitting device, and a specific amount of traction torque delivered to the drive wheels. The functional relationship between the start-up engine torque and the start-up rpm rate will subsequently be referred to as the start-up characteristic. The amount of gas pedal displacement is proportionate to the aperture of the throttle valve of the engine.

Further in FIG. 2, a brake-actuating element 120 is shown which serves to apply the service brake or the parking brake. This can be a brake pedal, a hand-brake lever, or a hand- or foot-operated actuating element of the parking brake. At least one sensor 121 is arranged at the actuating element 120 to monitor the actuation of the latter. The sensor 121 may be a digital sensor, e.g., a binary switch for detecting whether the actuating element is in an applied or non-applied state. This sensor may be connected to a signal device such as a brake indicator light to alert the driver that the brake is applied. This arrangement can be used for the service brake as well as the parking brake. However, the sensor can also be configured as an analog sensor, e.g., as a potentiometer that measures the degree of displacement of the actuating element. This sensor, likewise, can be connected to a signal indicator device.

Figure 3:
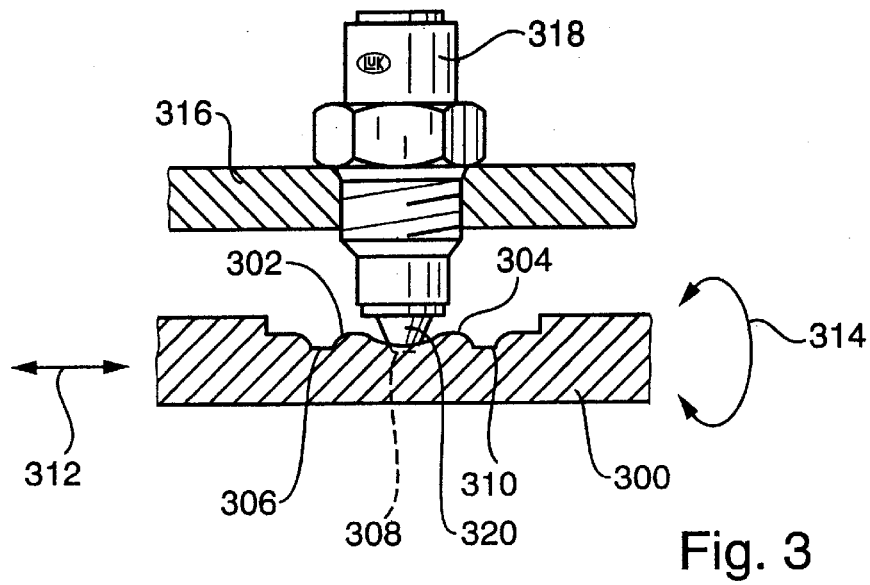
FIG. 3 represents a partial schematic view of a third exemplary embodiment of the invention.

FIG. 3 illustrates a part of a shifter shaft 300 with a surface profile. The surface profile of the shifter shaft 300 has raised surface portions 302, 304 as well as depressed surface portions 306, 308, 310.

The shifter shaft 300 actuates the transmission by moving axially as indicated by the double-headed arrow 312, and by rotating as indicated by the double-headed arrow 314.

The retainer element 318 which is mounted in the transmission housing 316 contains a spring-biased feeler element 320 which bears against the profiled surface of the shifter shaft 300. The feeler element 320 can have, e.g., a spherical shape or a rounded tip. As the shifter shaft moves in one of the aforementioned directions, the spring-biased feeler element 320 follows the profile of the shifter shaft, i.e., the feeler element 320 moves back and forth along the axis of the retainer element 318.

A condition where the feeler element 320 is positioned in one of the profile depressions 306, 308, 310 of the shifter shaft 300 corresponds to a state where the transmission or, more specifically, a first shifter element (not shown in the drawing) of the transmission is positioned in one of the predetermined shift positions in a track pattern with a selector track and shift tracks.

The profile depression 306 illustrated in FIG. 3 is one of three depressions 306 that the spring-biased feeler element 320 will encounter along the circumference of the shaft 300 at the same axial position. The positions of the shifter shaft 300 where the feeler element 320 is at the bottom of one of the three depressions 306 correspond to the respective end positions where the first, third, or fifth gear is fully engaged.

Analogously, a position of the shifter shaft 300 where the feeler element 320 is at the bottom of the profile depression 308 corresponds to the neutral state of the transmission.

Analogous to the profile depressions 306, there are three depressions 310 on another circumference of the shaft 300. The positions of the shifter shaft 300 where the feeler element 320 is at the bottom of one of the three depressions 310 correspond to the respective end positions where the second, fourth, or reverse gear is fully engaged.

Preferably, the detent arrangement of FIG. 3 or more specifically the retainer element 318 generates redundant signals in particular at the fully engaged end positions of the gear stages of the transmission, as a back-up for the signals or measurement values of a position measuring device.

The retainer element 318 contains a sensor (not shown) which detects the different positions of the spring-biased feeler element 320 relative to the axial direction of the retainer element 318. In particular, this sensor serves to detect when the feeler element 320 is positioned in one of the profile depressions 306, 308, 310.

Figure 4:
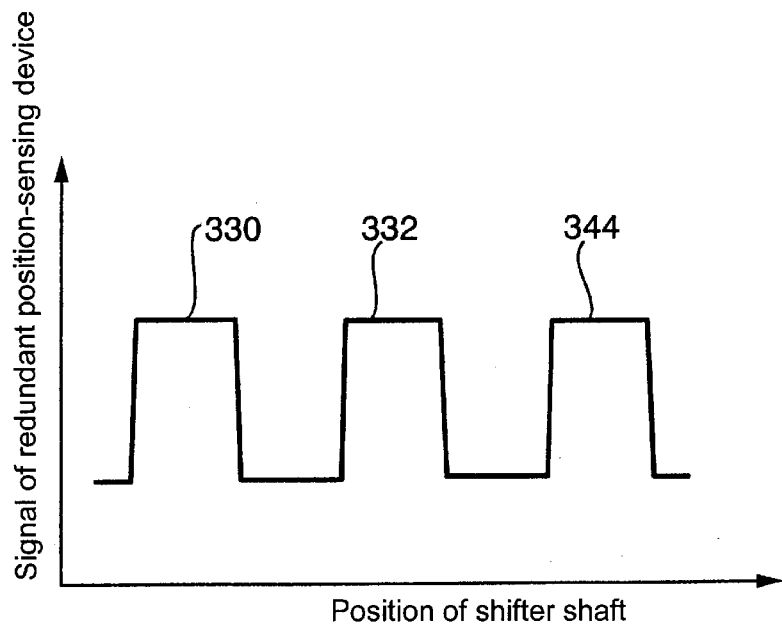
FIG. 4 represents an example of a signal generated by a redundant position-detecting device as a function of the position of a shifter shaft.

FIG. 4 shows an example of the redundant signal or backup signal that can be generated by the retainer element of FIG. 3 or, more specifically, by the sensor that is part of the retainer element 318.

The graph of FIG. 4 correlates the redundant sensor signal to the position of the shifter shaft. The signal 330 of FIG. 4 corresponds to the end positions of the shift movement where the transmission is in first, third, or fifth gear.

The signal 332 of FIG. 4 corresponds to a neutral position of the transmission.

The signal 334 corresponds to the end positions of the shift movement where the transmission is in second, fourth, or reverse gear.

Figure 5:
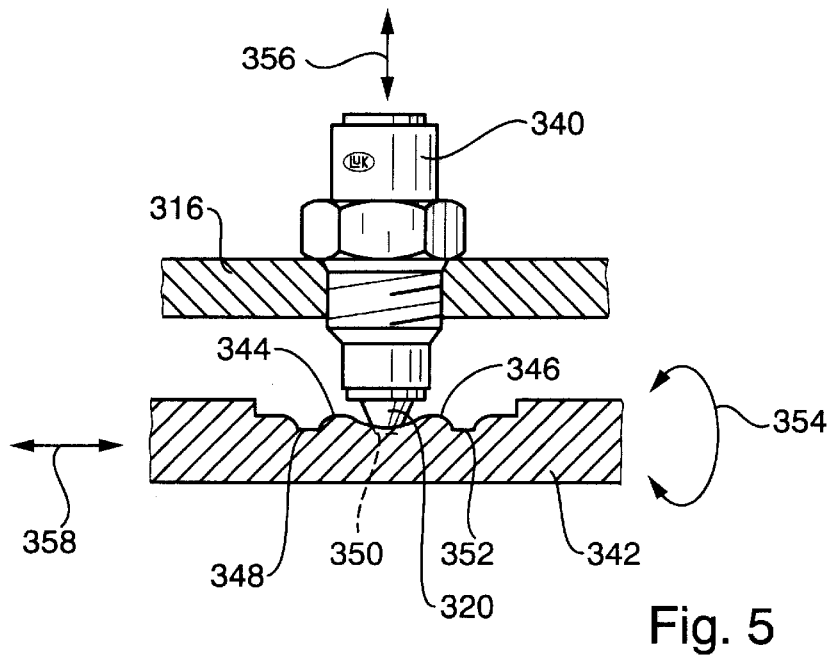
FIG. 5 represents a partial schematic view of a fourth exemplary embodiment of the invention.

FIG. 5 represents an example of an embodiment of the invention that is distinguished from the embodiment of FIG. 3 by the fact that the profile depressions are configured differently, and that the profile depressions and predetermined shift positions are correlated differently.

Like the retainer element 318 of the previous example, the retainer element 340 of FIG. 5 is mounted in the transmission housing 316 and has a spring-biased feeler element 320 that is pushed by a spring device (not shown) against the surface profile of the shifter/selector shaft 342. The movement of the spring-loaded feeler element 320 in the sense indicated by the double-headed arrow 356 is detected by a sensor in the retainer element 340 (not shown).

The surface profile has raised portions 344, 346 as well as depressed portions 348, 350, 352. The depressions 348, 350, 352 in the embodiment of FIG. 5 are grooves that extend over at least part of the circumference of the shifter/selector shaft 342. The bottom of each of the grooves 348, 350, 352 runs at a substantially constant radial distance from the central axis of the shaft 342.

When the spring-biased feeler element 320 is positioned in one of the depressions 348, 350 or 352 and the shifter/selector shaft is rotated about its longitudinal axis as indicated by the double-headed arrow 354, the feeler element 320 performs substantially no movement in the sense of the double-headed arrow 356 and consequently, there is no change in the redundant back-up signal.

If the shifter/selector shaft 342 is moved in the sense of the double-headed arrow 358 into predetermined shift positions, the raised profile portions 344, 346 cause the spring-biased feeler element 320 to move in the direction indicated by the arrow 356. At a predetermined position of the feeler element 320, the sensor of the retainer device 340 changes its output signal. The change may indicate, e.g., that the first shifter element (not shown) has left the selector track of the shift pattern or is being moved back to the selector track.

A position of the shifter/selector shaft 342 where the spring-biased feeler element 320 engages the depression 348 is preferably associated with a state of the transmission where the first shifter element is positioned in the shift track for first and second gears. When the depression 350 is engaged by the feeler element, the first shifter element will be in the shift track for third and fourth gears, and if the depression 352 is engaged by the feeler element, the first shifter element will be in the shift track for fifth and reverse gears.

In the foregoing arrangement, a movement of the shifter/selector shaft 342 in the sense of the double arrow 358 has the effect of pushing the first shifter element (not shown) in the direction of the selector track.

FIGS. 6 to 12 represent examples of signal patterns associated with the track pattern of a selector track and shift tracks.

The signal patterns correspond to a field, a field-like area, or a profiled surface that is arranged in particular on a second shifter element (of which the shifter shaft is a specific example). The signal patterns can also be interpreted as projections of the field, field-like area, or surface profile, which have been transformed according to a predetermined transformation characteristic.

Each of the signal patterns is divided into different domains to which predetermined signal states are assigned. A domain can consist of one contiguous area or of a set of separate areas. In each of the FIGS. 6 to 12, the domains are distinguished from each other by different styles of cross-hatching or by the absence of cross-hatching. As a first shifter element (not shown) is moved across a boundary between adjacent domains, this will under predetermined conditions result in a change or switching of a signal that is detected by a sensor. A given signal pattern can be variable or invariable. A signal pattern in a given transmission is referred to as invariable if the domains never change their shapes and sizes nor their arrangement in relation to each other and to the shift pattern. If this is not the case, the signal pattern is referred to as variable. The arrangement may function in such a way that a signal switch will be detected every time when a first shifter element is moved across a domain boundary, or alternatively, it may work in a way where a signal switch is detected only if the first shifter element is moved across the boundary in one predetermined sense of direction, but not in the opposite sense.

Figure 6:
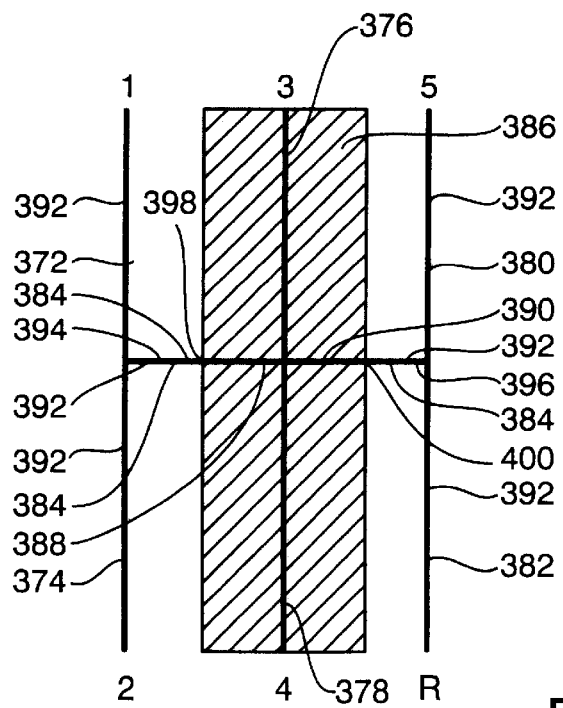
FIG. 6 represents a schematic view of a first embodiment of a signal pattern according to the invention.

FIG. 6 represents a schematic view of a first embodiment of a signal pattern according to the invention.

The track pattern of FIG. 6 has shift tracks 372 for first gear, 374 for second gear, 376 for third gear, 378 for fourth gear, 380 for fifth gear, 382 for reverse gear, as well as a selector track 384.

A first domain 386, identified by cross-hatching, covers the shift tracks 376 and 378 as well as the segments 388 and 390 of the selector track 384. A second domain 392, identified by the absence of cross-hatching, covers the shift tracks 372, 374, 380, 382 as well as the segments 394, 396 of the selector track 384. When the first shifter element (not shown) is moved across the boundary 398, 400, the redundant position sensing device will detect or generate a signal change.

Figure 7:
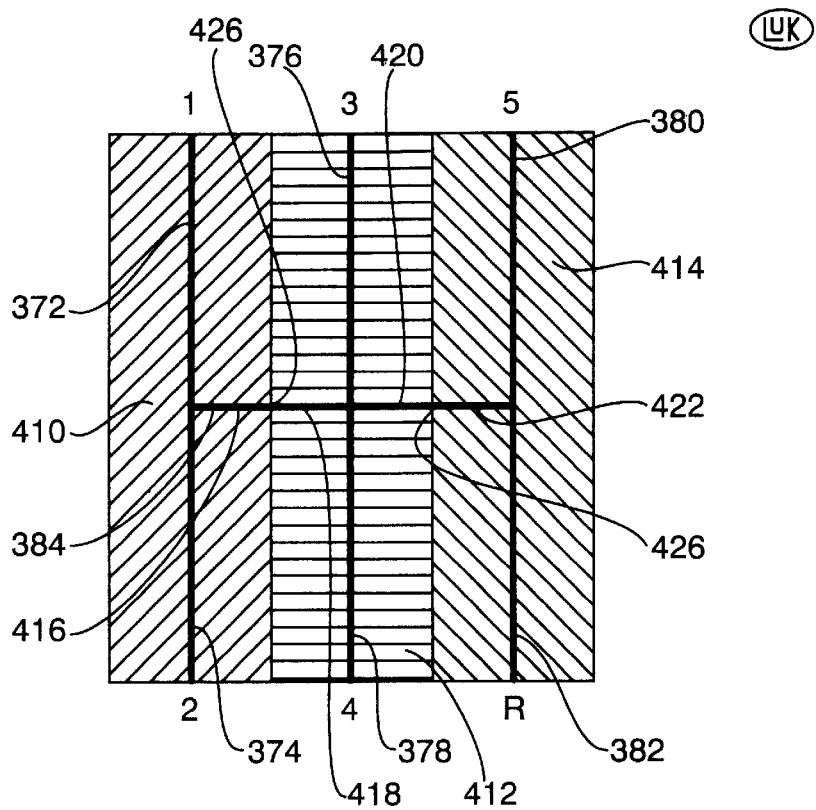
FIG. 7 represents a schematic view of a second embodiment of a signal pattern according to the invention.

FIG. 7 shows a signal pattern with three domains 410, 412, 414. The domain 410 covers the shift tracks 372, 374 as well as the segment 416 of the selector track 384. The domain 412 covers the shift tracks 376, 378 as well as the segments 418, 420 of the selector track 384. The domain 414 covers the shift tracks 380, 382 as well as the segment 422 of the selector track 384.

A change in the signal from one state to another is detected when a first shifter element crosses the domain boundary 424 between the domains 410 and 412, and also when the first shifter element crosses the domain boundary 426 between the domains 412 and 414.

The domains 410, 412, 414 are associated with different signals.

Figure 8:
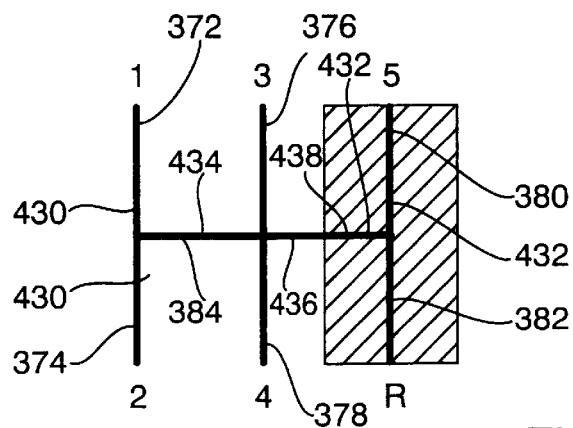
FIG. 8 represents a schematic view of a third embodiment of a signal pattern according to the invention.

FIG. 8 schematically illustrates a third example of a signal pattern.

The pattern of FIG. 8 has a first domain 430 and a second domain 432, with a predetermined signal assigned to each domain.

The domain 430 covers the shift tracks 372, 374, 376, 378 as well as the segments 434 and 436 of the selector track 384. The domain 432 covers the shift tracks 380, 382 as well as the segment 438 of the selector track 384.

Figure 9:
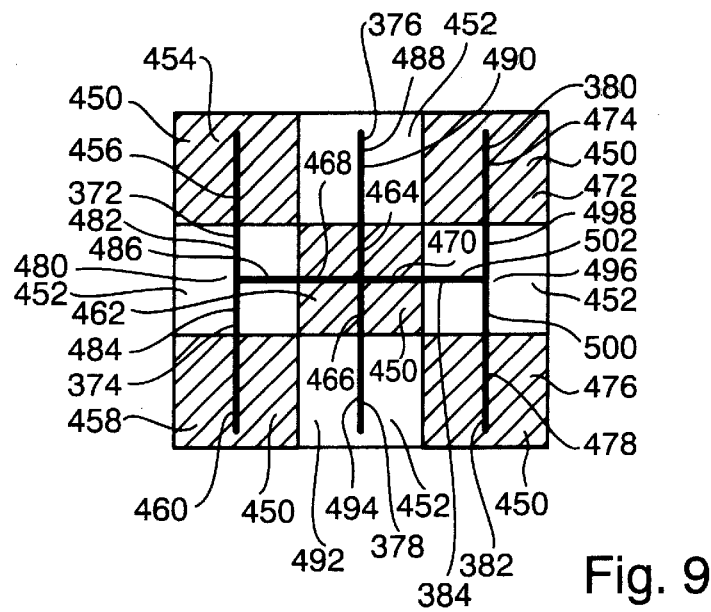
FIG. 9 represents a schematic view of a fourth embodiment of a signal pattern according to the invention.

FIG. 9 schematically illustrates a fourth example of a signal pattern.

The pattern of FIG. 9 resembles a chessboard and has two domains 450, 452, each of which is associated with a predetermined signal.

The domain 450 is divided into subdomains, as follows:
subdomain 454 covering the segment 456 of the shift track 372;
subdomain 458 covering the segment 460 of the shift track 374;
subdomain 462 covering the segment 464 of the shift track 376, the segment 466 of the shift track 378, and the segments 468, 470 of the selector track 384;
subdomain 472 covering the segment 474 of the shift track 380; and
subdomain 476 covering the segment 478 of the shift track 382.

The domain 452 is divided into subdomains, as follows:
subdomain 480 covering the segment 482 of the shift track 372, the segment 484 of the shift track 374, and the segment 486 of the selector track 384;
subdomain 488 covering the segment 490 of the shift track 376;
subdomain 492 covering the segment 494 of the shift track 378;
subdomain 496 covering the segment 498 of the shift track 380, the segment 500 of the shift track 382, and the segment 502 of the selector track 384.

Figure 10:
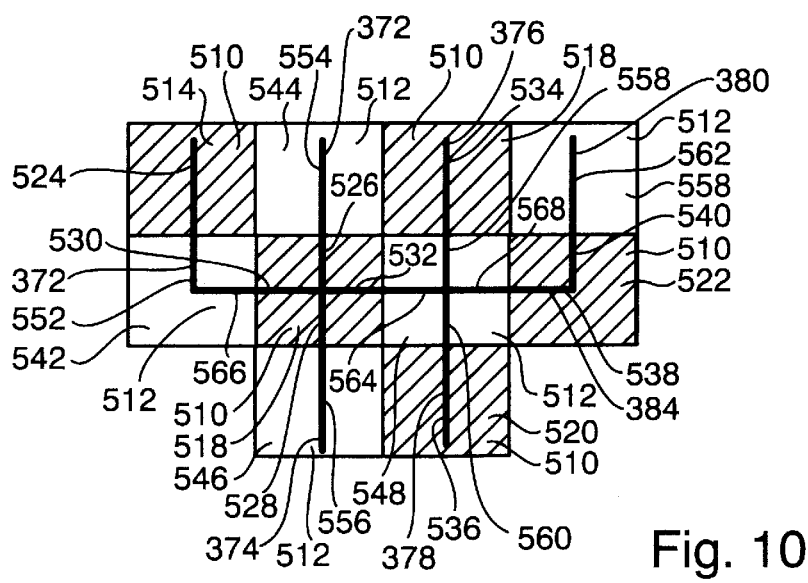
FIG. 10 represents a schematic view of a fifth embodiment of a signal pattern according to the invention.

FIG. 10 shows another chessboard-like signal pattern, which is similar to the pattern of FIG. 9 except that FIG. 9 applies to a pattern configuration with three shift-tracks while FIG. 10 applies to a configuration with four shift tracks.

The pattern of FIG. 10 has two domains 510, 512, each of which is associated with a predetermined signal.

The domain 510 is divided into subdomains 514, 516, 518, 520, 522 covering segment 524 of shift track 382, segment 526 of shift track 372, segment 528 of shift track 374, segment 534 of shift track 376, segment 536 of shift track 378, segment 540 of shift track 380, as well as the segments 530, 532, 538 of the selector track 384.

The domain 512 is divided into subdomains 542, 544, 546, 548, 550 covering segment 552 of shift track 382, segment 554 of shift track 372, segment 556 of shift track 374, segment 558 of shift track 376, segment 560 of shift track 378, segment 562 of shift track 380, as well as the segments 564, 566, 568 of the selector track 384.

Figure 11:
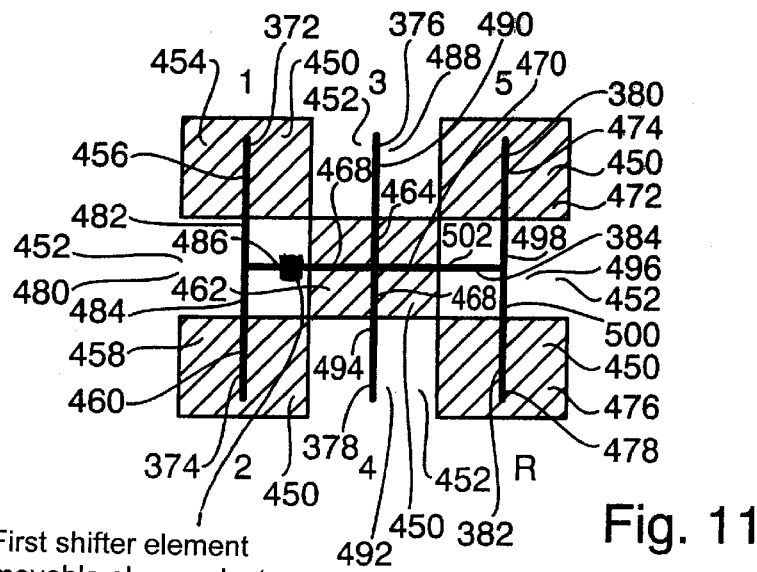
FIG. 11 represents a schematic view of a sixth embodiment of a signal pattern according to the invention.

The signal pattern of FIG. 11 is analogous to the pattern of FIG. 9, except that the subdomains in FIG. 9 are quadratic, while the subdomains 454, 458, 462, 472, 476, 480, 488, 492, 496 in the pattern of FIG. 11 are rectangular, i.e., not all of the subdomain borders are of the same length.

Figure 12:
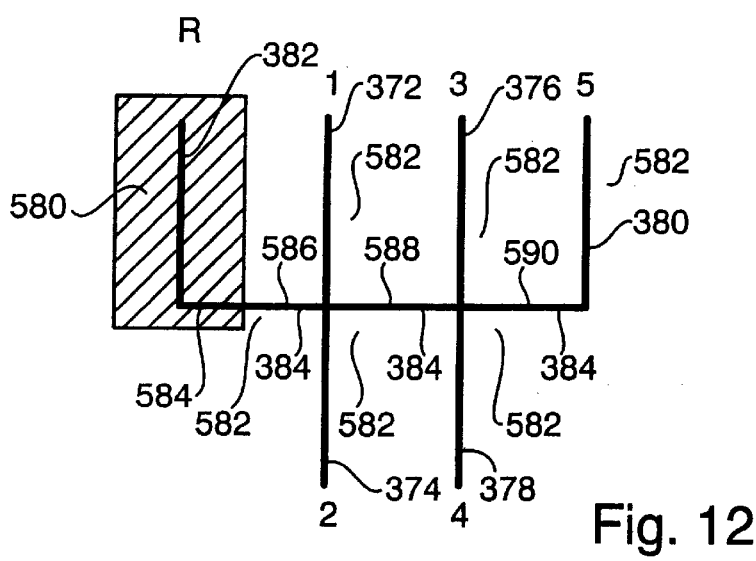
FIG. 12 represents a schematic view of a seventh embodiment of a signal pattern according to the invention.

The signal pattern of FIG. 12 has the domains 580 and 582, to which different signals are assigned. The first domain, i.e., domain 580, covers the shift track 382 as well as the segment 584 of the selector track 384.

The second domain, i.e., domain 582, covers the domains 586, 588, 590 of the selector track 384, and it also covers the shift tracks 372, 374, 376, 378, 380.

Figure 13:
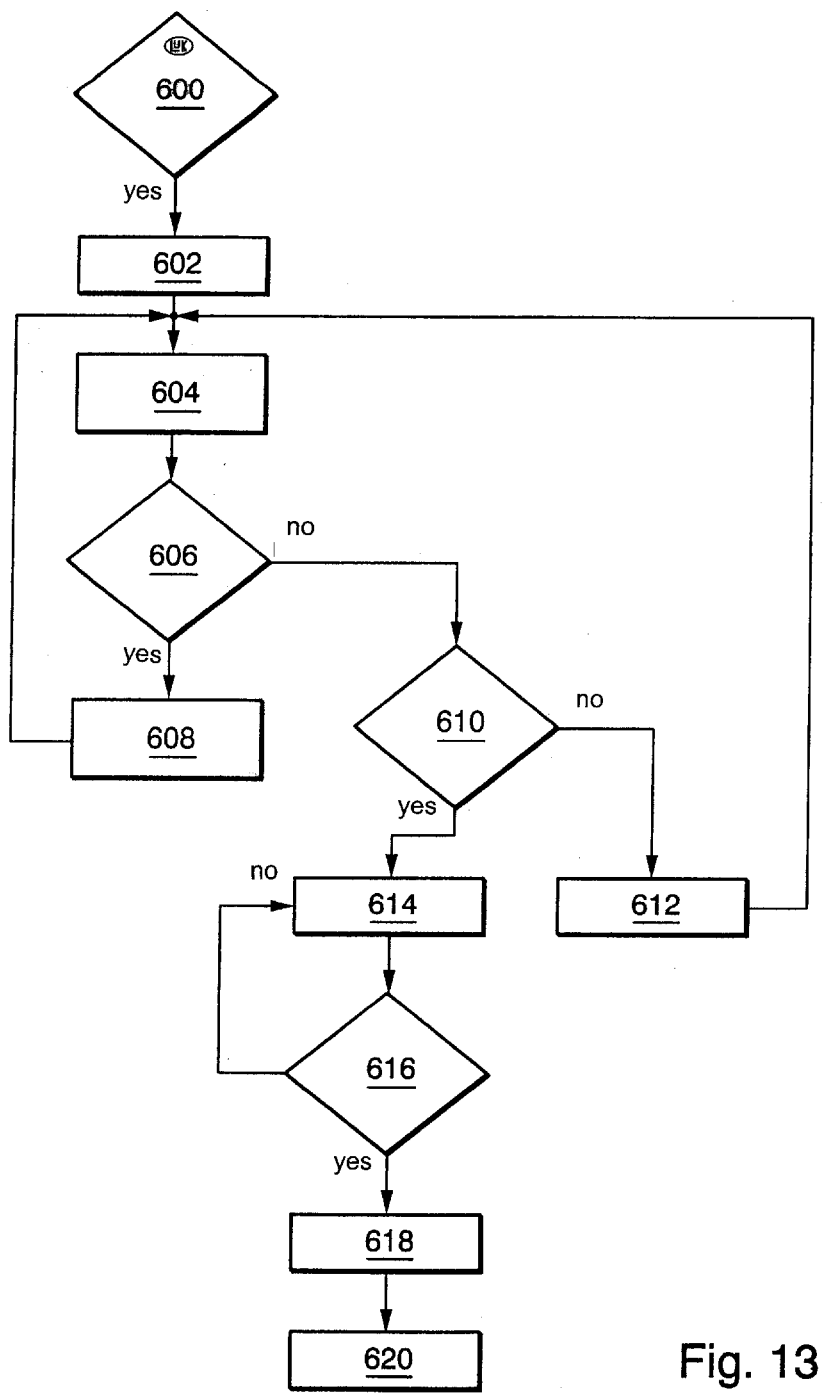
FIG. 13 represents a flowchart that schematically illustrates the steps of a first example of a method according to the invention.

FIG. 13 illustrates in flow-chart format an example of a method according to the invention, which applies specifically to the case of shifting from reverse gear into first gear in a transmission with a signal pattern according FIG. 8.

Step 600 represents an interrogation whether a shift from reverse into first gear is to be performed. In the affirmative case, the clutch of the motor vehicle with the inventive transmission is taken out of engagement in step 602. Next, i.e., in step 604, the selector motor is activated for a leftward movement. A leftward movement in this context means that a shifter element (not shown) is pushed along the selector track from the shift tracks 380, 382 towards the shift tracks 372, 374.

Step 606 represents a test whether the signal associated with the domain 432 is present. In the affirmative case, the method continues to step 608, where the program flow is directed back to step 604 to continue the leftward movement.

In the negative case of step 606, i.e., if the signal associated with domain 432 is not present, the program flow is directed to step 610 in which a test is performed whether the first shifter element has reached an end position of the selector track, specifically the leftward end position. This test loop can be performed in timed intervals.

In the negative case of step 610, i.e., if the first shifter element has not reached an end position, the method continues at step 612 where the program flow is directed back to step 604 to continue the leftward movement.

In the affirmative case of step to step 610, i.e., if the first shifter element has reached an end position, the method continues at step 614, where the shifter motor is activated for upward movement. An upward movement in this context means that a shifter element (not shown) is pushed into the shift track 372.

Next, in step 616, a test is performed whether the first shifter element has reached an end stop of a shift track. This test can be performed in a time-controlled loop. In the negative case of step 616, the program flow is directed back to step 614 to continue the upward movement of the first shifter element in the shift track 372.

In the affirmative case of step 616, i.e., if the first shifter element has reached an end stop, the method proceeds to step 618 where the clutch is moved back into engagement. Step 620 concludes the process by registering that the transmission is now in first gear.

Figure 14:
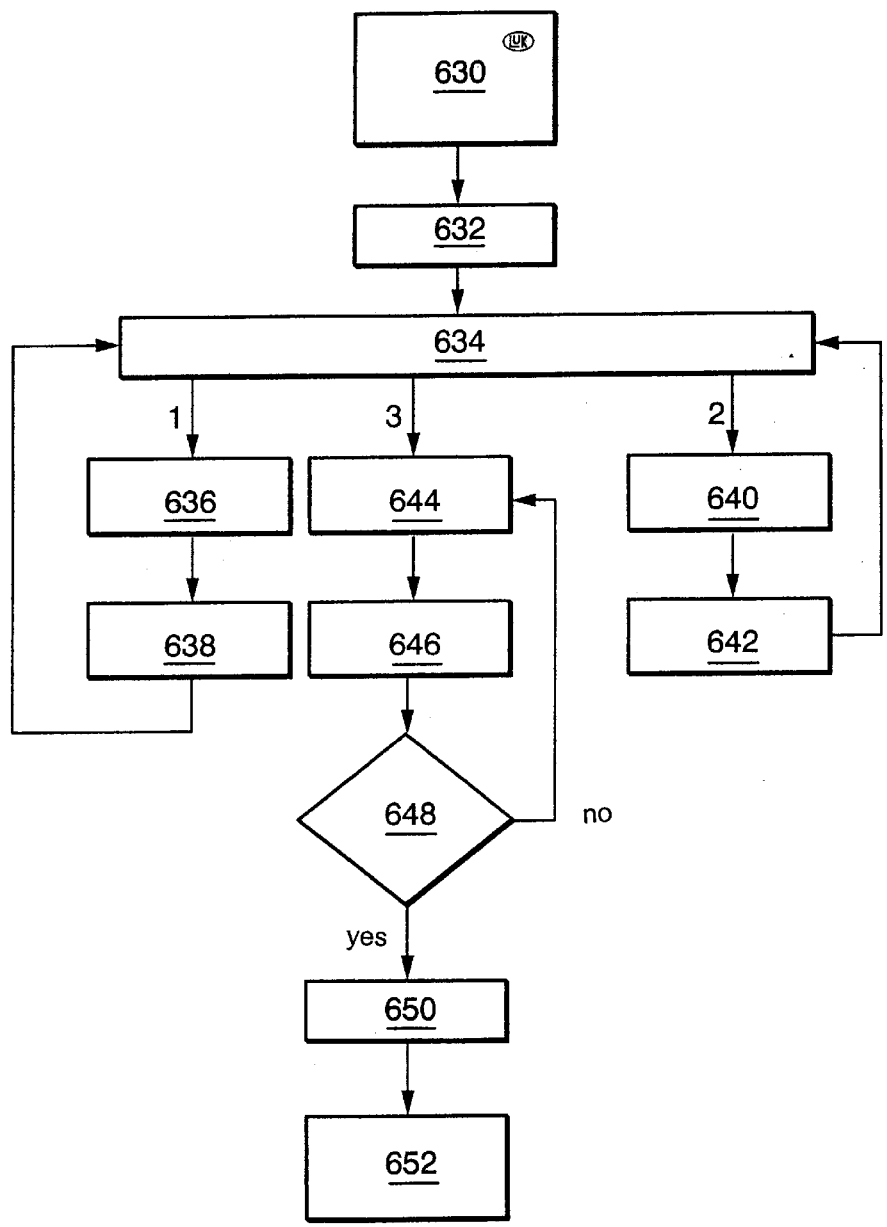
FIG. 14 represents a flowchart that schematically illustrates the steps of a second example of a method according to the invention.

FIG. 14 illustrates in flow-chart format an example of a method according to the invention, which applies specifically to the case of shifting from second gear into reverse gear in a transmission with a signal pattern according to FIG. 7.

Process step 630 represents the operation of determining or registering that a shift from second into reverse gear is to be performed. The method proceeds to step 632, in which the clutch is taken out of engagement.

Next, i.e., in step 634, a test is performed on a signal that indicates in which of the domains 410, 412, 414 the first shifter element is positioned.

If in step 634, the shifter element is found in the domain 410, the shifter motor is activated in step 636 for an upward movement. Next, in step 638, the selector motor is activated for a rightward movement, and the program flow loops back to step 634.

If in step 634, the shifter element is found in the domain 412, the shifter motor is turned off in step 640. Next, in step 642, the selector motor is activated for a rightward movement, and the program flow loops back to step 634.

If in step 634, the shifter element is found in the domain 414, the shifter motor is turned off in step 644. Next, in step 646, the selector motor is activated for a rightward movement. In step 648, a test is performed whether the first shifter element is in an end position of the selector movement. In the negative case of step 648, the program flow is directed back to step 644.

In the affirmative case of step 648, i.e., if the first shifter element is in an end position, the clutch is moved into engagement in step 650, and the process is concluded in step 652 by registering that the transmission is now in reverse gear.

Figure 15:
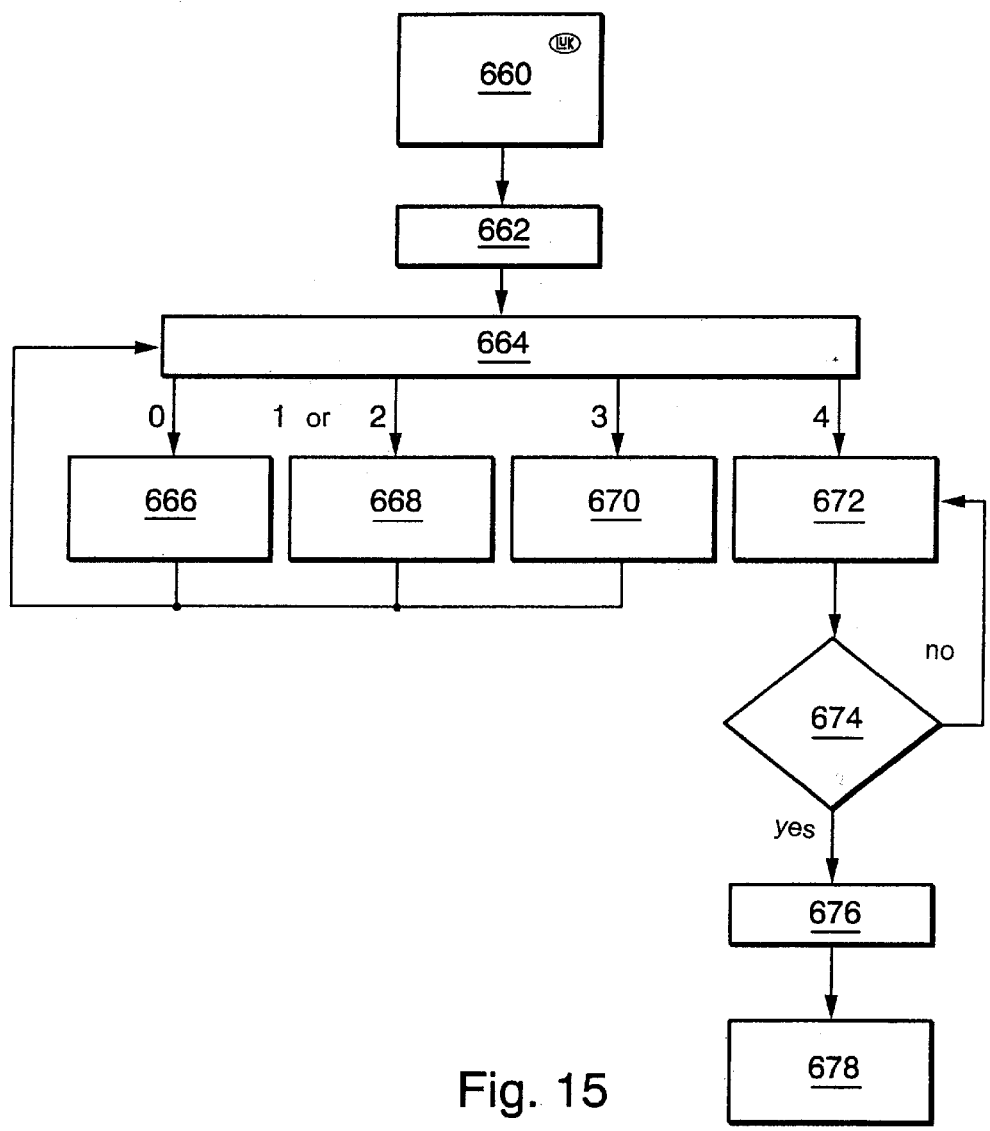
FIG. 15 represents a flowchart that schematically illustrates the steps of a third example of a method according to the invention.

FIG. 15 illustrates in flow-chart format an example of a method according to the invention, which applies specifically to the case of shifting from reverse gear into first gear in a transmission with a signal pattern according FIG. 11.

Process step 660 represents the operation of determining or registering that a shift from reverse into first gear is to be performed. The method proceeds to step 662, in which the clutch is taken out of engagement. Next, i.e., in step 664, the number of signal changes is counted that have taken place during the movement of the first shifter element. A signal change occurs every time when the first shifter element runs across a border between adjacent domains. If no signal change has been detected in step 664, the method proceeds to step 666 where the shifter motor is activated for upward movement while the selector motor is switched off. If one or two signal changes have been registered in step 664, the method proceeds to step 668 where the shifter motor is turned off and the selector motor is activated for leftward movement. If three signal changes have been registered in step 664, the method proceeds to step 670 where the shifter motor is activated for upward movement and the selector motor is activated for leftward movement. After the steps 660, 668, 670, the method loops back to step 664.

If four signal changes have been registered in step 664, the method proceeds to step 672, where the shifter motor is activated for upward movement and the selector motor is switched off. In step 674, a test is made whether the first shifter element has reached an end position in the shift direction. This test is performed in a time loop. As long as the outcome of step 674 is negative, the process loops back to step 672.

After an affirmative outcome of step 674, i.e., if the first shifter element has reached an end position, the clutch is moved into engagement in step 676.

The process is concluded in step 678 by registering that the transmission is now in first gear.

Figure 16:
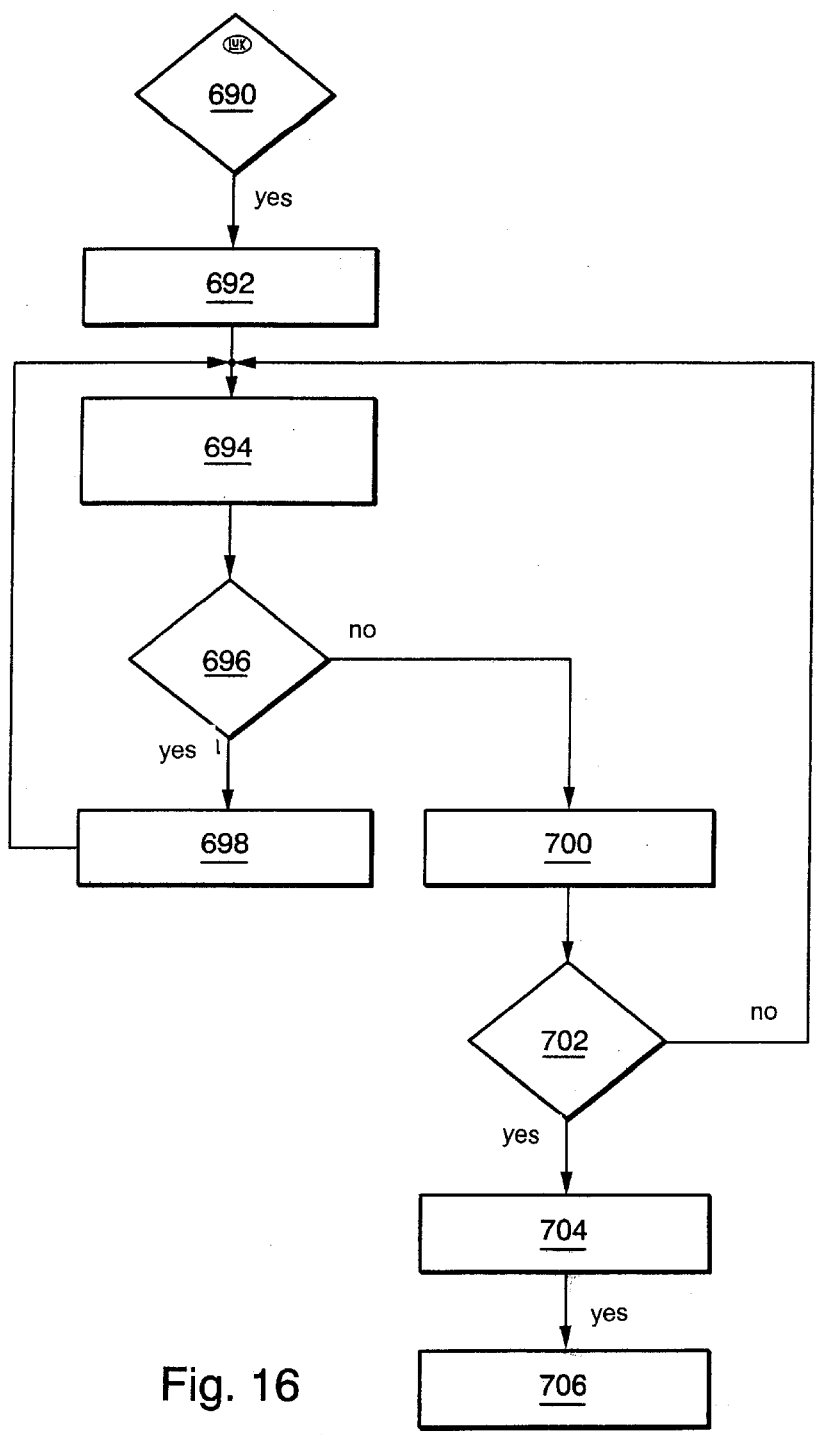
FIG. 16 represents a flowchart that schematically illustrates the steps of a fourth example of a method according to the invention.

FIG. 16 illustrates in flow-chart format an example of a method according to the invention, which can be used if a malfunction has been detected in the primary position-detecting device and which applies specifically to a transmission with a signal pattern according FIG. 12.

Step 690 represents an interrogation whether a shift from reverse into first gear is to be performed. In the affirmative case, the clutch of the motor vehicle with the inventive transmission is taken out of engagement in step 692. Next, i.e., in step 694, the selector motor is activated for a rightward movement. Step 696 represents a test whether the signal associated with the domain 580 is present, i.e., whether the first shifter element is within the domain 580.

In the affirmative case of step 696, the method continues to step 698, where the shifter motor is activated for downward movement (in relation to the shift-pattern arrangement of FIG. 12) and the program flow is directed back to step 694.

In the negative case of step 696, i.e., if the signal associated with domain 580 is not present, the program flow is directed to step 700, where the shifter motor is activated for upward movement (in relation to the shift-pattern arrangement of FIG. 12).

In step 702, a test is performed whether the first shifter element has reached an end position in the direction of the shift tracks. This test is performed in particular in a time-controlled loop. In the negative case of step 702, i.e., if the first shifter element has not reached an end position, the program flow is directed back to step 694.

In the affirmative case of step to step 702, i.e., if the first shifter element has reached an end position, the method continues at step 704 where the clutch is moved back into engagement. Step 706 concludes the process by registering that the transmission is now in first gear.

Figure 17:
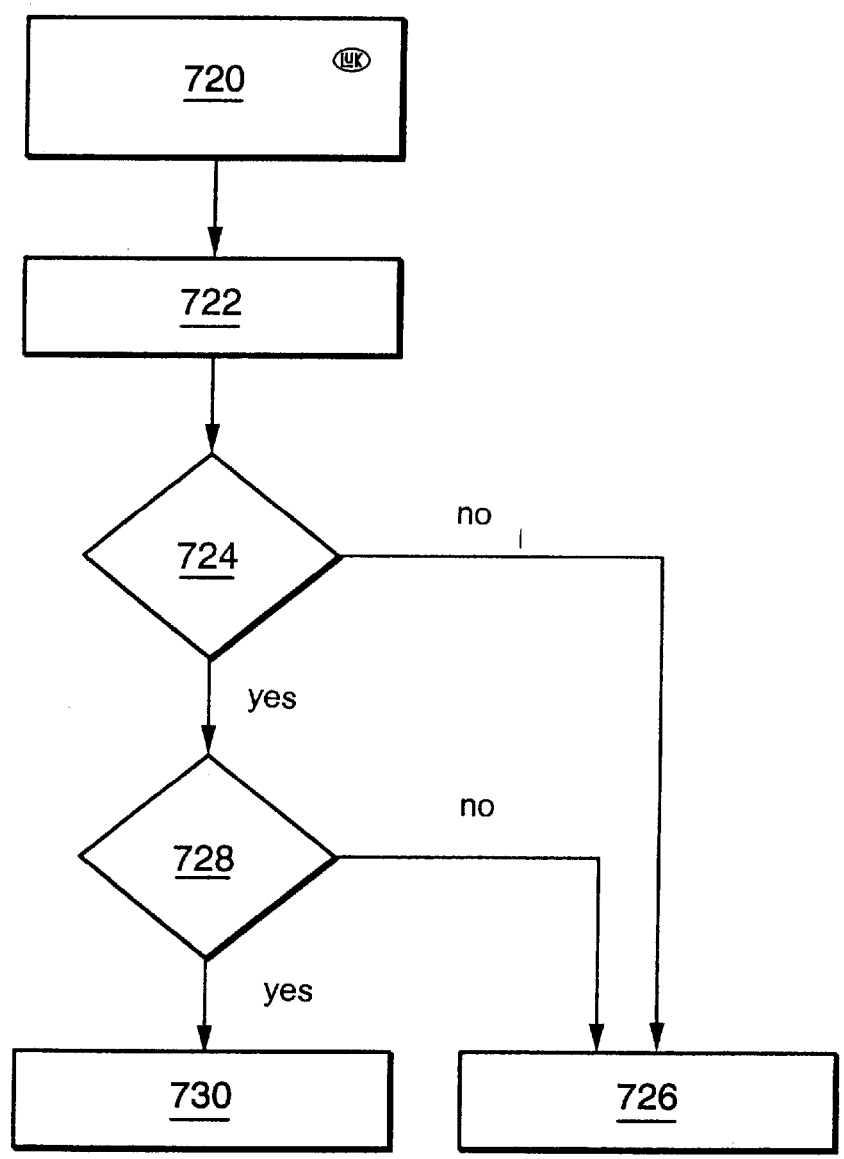
FIG. 17 represents a flowchart that schematically illustrates the steps of a fifth example of a method according to the invention.

FIG. 17 illustrates in flow-chart format an example of a method according to the invention, which can be used to verify whether a primary position-detecting device is indicating correct position values and which applies specifically to a transmission with a signal pattern according FIG. 11.

Process step 720 represents the operation of determining or registering that a shift from second into reverse gear is to be performed. Also in step 720, the number of signal changes is determined that should be detected in the course of this gear shift. With the signal pattern of FIG. 11, a shift from second into reverse gear will cause four signal changes.

Step 722 represents the complete shifting process from second into reverse gear.

In step 724, a test is made whether the actual number of detected signal transitions was four. In the negative case of step 724, i.e., if a number other than four was detected, the program flow is directed to step 726 where a determination is made that the signals are not being correctly generated and/or the primary position-detecting device is malfunctioning.

In the affirmative case of step 724, the program flow is directed to step 728, where a check is performed whether the last detected signal corresponds to the type of signal that has been assigned to the reverse gear.

In a transmission with the signal pattern of FIG. 11, the signal assigned to reverse gear is of the type associated with the subdomain 476, i.e., the signal type of the domain 450.

In the negative case of step 724, i.e., if the last detected signal was not of the type associated with the reverse gear position, the program flow is directed to step 726 where a determination is made that the signals are not being correctly generated and/or the primary position-detecting device is malfunctioning.

In the affirmative case of step 728, i.e., if the last detected signal was of the type associated with the reverse gear position, the program flow is directed to step 730 where a determination is made that the signals are being correctly generated and/or the primary position-detecting device is not malfunctioning.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the aforedescribed contribution to the art and, therefore, such adaptations should and are intended to be comprehended within the meaning and range of equivalence of the appended claims.

What is claimed is:

1. A transmission for a motor vehicle, wherein the transmission is shiftable into different shift positions corresponding to different transmission ratios, said transmission comprising:

a track pattern with a selector track running in a selector direction and shift tracks running in a shift direction, a first movable shifter element, and a second movable shifter element, wherein at least one of the first and second movable shifter elements has a shifter element position that is movable in relation to the selector direction and the shift direction, and wherein a change of the shifter element position will cause a shift from one to another of said shift positions;

an actuator device operable to apply an actuating force to at least one of the first and second movable shifter elements;

a control device operable to send command signals to the actuator device and thereby causing the actuator device to apply said actuating force;

a main position-detecting device operable to detect the shifter element position; and a redundant position-detecting device operable to detect the shifter element position.

2. The transmission of claim 1, wherein the redundant position-detecting device comprises a sensor device operable to generate a sensor signal indicative of the shifter element position.

3. The transmission of claim 2, wherein the shifter element position is movable within an area comprising a first domain and a second domain of shifter element positions, where each of said first and second domains can be of a contiguous as well as a non-contiguous configuration, and wherein the sensor device comprises a binary sensor generating a first signal when the shifter element position is in the first domain and a second signal when the shifter element position is in the second domain.

4. The transmission of claim 2, wherein the shifter element position is movable within an area comprising an analog sensor range and the sensor device comprises an at least partially analog sensor operable within the analog sensor range to generate a steplessly variable signal indicative of the shifter element position.

5. The transmission of claim 1, comprising at least one physical quantity that is variable as a function of location, in the manner of a field, wherein said field is defined for a plurality of different field locations, and wherein at least a part of the shift positions can be correlated to the different field locations.

6. The transmission of claim 5, the at least one of the first and second movable shifter elements is subjected to the field and predetermined locations of the shifter element position can be correlated to the different field locations.

7. The transmission of claim 5, wherein the redundant position-detecting device is operable to detect the shifter element position based on said field.

8. The transmission of claim 5, wherein the redundant position-detecting device uses at least one of a sensor device and a computing device to determine a current field location according to a predetermined characteristic relationship and to draw from said current field location a conclusion with regard to the shifter element position.

9. The transmission of claim 5, wherein the redundant position-detecting device comprises a field-sensing element and wherein the field and the field-sensing element cooperate with each other as they move in relation to each other.

10. The transmission of claim 9, wherein the field is arranged on the second movable shifter element.

11. The transmission of claim 9, wherein the at least one physical quantity is a signal taking on different signal values at the different field locations.

12. The transmission of claim 11, wherein the signal is a digital signal.

13. The transmission of claim 9, wherein the physical quantity comprises an energy potential.

14. The transmission of claim 13, wherein the field has a gradient representing a force.

15. The transmission of claim 14, wherein the field comprises a profiled surface, the different field locations comprise different surface locations on the profiled surface, the field-sensing element comprises a feeler element urged into contact with the profiled surface by a spring force, and wherein said spring force varies as a function of the different surface locations.

16. The transmission of claim 15, wherein a movement of at least one of the first and second shifter elements is opposed by a resistive force that can differ when the field-sensing element is at different field locations.

17. The transmission of claim 15, wherein the profiled surface is arranged on the second shifter element and the different surface locations comprise at least one raised location and at least one depressed location.

18. The transmission of claim 17, wherein the second shifter element comprises a longitudinal axis and the different surface locations are distinguished by having different distances from the longitudinal axis.

19. The transmission of claim 18, wherein the feeler element follows the profiled surface and wherein the spring-force acts in a radial direction relative to the longitudinal axis.

20. The transmission of claim 19, comprising a retainer element that includes the feeler element and further includes a position transducer operable to detect the different field locations.

21. The transmission of claim 20, wherein the position transducer detects the different field locations by detecting a translatory movement of the feeler element.

22. The transmission of claim 21, wherein the position transducer is operable to generate a position signal indicative of the shift position, and wherein the shift position corresponds to one of a plurality of specific gear levels, specific points of synchronizer engagement, and a neutral state of the transmission.

23. The transmission of claim 22, wherein the position signal can be transmitted to one of the control device and the actuator device.

24. The transmission of claim 23, wherein the position signal is transmitted to the control device, and wherein the control device takes the position signal into account in generating the command signals.

25. The transmission of claim 22, wherein the gear levels, the neutral state, the selector track and the shift tracks each correspond to a specific level of the energy potential, and wherein said specific level can be the same or at least partially different for the gear levels, the neutral state, the selector track and the shift tracks.

26. The transmission of claim 20, wherein the retainer element is part of the redundant position-detecting device.

27. The transmission of claim 9, wherein the physical quantity has local extremes including local maxima and local minima and wherein at least one of the extremes corresponds to at least one of a shift position and a shifter element position.

28. The transmission of claim 27, wherein said at least one of the extremes comprises one of said local minima.

29. The transmission of claim 15, wherein the feeler element has a spherical shape.

30. The transmission of claim 9, wherein the field-sensing element is operable to detect the physical quantity through a non-contacting sensor principle.

31. The transmission of claim 27, wherein the at least one of a shift position and a shifter element position corresponds to one of the gear levels, the neutral state, and the areas of synchronizer engagement.

32. The transmission of claim 27, wherein the shifter element position, influenced by the field, can have a tendency to move towards one of the local extremes even when the actuating device is not exerting the actuating force.

33. The transmission of claim 5, wherein the physical quantity comprises one of a scalar quantity and a vector quantity.

34. The transmission of claim 5, wherein the field comprises an n-dimensional field in which n is a positive integer smaller than 4.

35. The transmission of claim 5, wherein the physical quantity can further be variable as a function of time.

36. The transmission of claim 5, wherein the physical quantity further depends on a predetermined characteristic operating value of the motor vehicle.

37. The transmission of claim 8, wherein the field correlates to a signal pattern that represents a transformed image of the field and is overlaid on the track pattern, wherein said signal pattern is composed of different domains separated by domain boundaries, and wherein further a predetermined signal value is assigned to each domain, so that different signal values are generated depending on which of the different domains the first shifter element is positioned in at a given time.

38. The transmission of claim 37, wherein the different domains comprise a number a of domains, a being a positive integer greater than 1.

39. The transmission of claim 38, wherein the different signal values comprise the number a of different signal values, and wherein one of the different signal values is assigned to each of the different domains.

40. The transmission of claim 37, comprising means of detecting from the signal pattern when the first shifter element is moved from one to another of the selector track and shift tracks.

41. The transmission of claim 37, comprising means of detecting from the signal pattern which one of the selector track and shift tracks the first shifter element is currently positioned in.

42. The transmission of claim 37, comprising means of detecting from the signal pattern when the first shifter element is moved from one gear level to another.

43. The transmission of claim 37, comprising means of detecting from the signal pattern which one of the gear levels the first shifter element is currently positioned in.

44. The transmission of claim 37, comprising means of detecting from the signal pattern when the first shifter element is positioned in an area where a synchronizer clutch engagement is taking place.

45. The transmission of claim 37, wherein a uniquely defined signal value is assigned to each domain.

46. The transmission of claim 40, wherein the means of detecting is based on at least one of the criteria of how many times the signal value is changing and what levels of magnitude the signal value is assuming while the first shifter element is moved from one to another of the selector track and shift tracks.

47. The transmission of claim 41, wherein the means of detecting is based on at least one of the criteria of how many times the signal value is changing and what levels of magnitude the signal value is assuming while the first shifter element is moved from one to another of the selector track and shift tracks.

48. The transmission of claim 42, wherein the means of detecting is based on at least one of the criteria of how many times the signal value is changing and what levels of magnitude the signal value is assuming while the first shifter element is moved from one to another of the selector track and shift tracks.

49. The transmission of claim 43, wherein the means of detecting is based on at least one of the criteria of how many times the signal value is changing and what levels of magnitude the signal value is assuming while the first shifter element is moved from one to another of the selector track and shift tracks.

50. The transmission of claim 37, wherein the domains are arranged so that at least one of the domain boundaries runs in one of the directions parallel and perpendicular to one of the selector direction and the shift direction.

51. The transmission of claim 37, wherein the sensor device detects a change of the signal value when the first shifter element moves across one of the domain boundaries.

52. The transmission of claim 37, wherein the signal pattern configured to resemble a chessboard.

53. The transmission of claim 37, comprising a computing device operable to hold stored data about the signal pattern and to determine based on the stored data and the signal values detected by the sensor device when the first shifter element moves from one to another of the selector track and shift tracks.

54. The transmission of claim 37, wherein the redundant position-detecting device is operable to distinguish when the detected shift position represents at least one of a fully engaged gear position and a neutral position from when the detected shift position represents neither of said fully engaged gear position and neutral position.

55. The transmission of claim 8, wherein the sensor device comprises at least one of an electro-mechanical contact sensor, a Hall-effect sensor, an inductive sensor, an optical sensor, a capacitative sensor, an acoustical sensor, and an electrical slider-contact sensor.

56. The transmission of claim 1, wherein the main position-detecting device comprises at least one first incremental sensor device operable to detect the shifter element position relative to the selector direction and at least one second incremental sensor device operable to detect the shifter element position relative to the shift direction.

57. The transmission of claim 37, a movement of the first shifter element across one of the domain boundaries is detected from a dynamic behavior of a predetermined characteristic operating value.

58. The transmission of claim 57, wherein the actuator device comprises at least one electric motor and the predetermined characteristic operating value comprises an electric current that is transmitted from the control device to the at least one electric motor.

59. The transmission of claim 57, wherein the dynamic behavior comprises a predetermined amount of change of the characteristic operating value.

60. The transmission of claim 58, wherein the field comprises a profiled surface and the domains represent surface portions characterized by slope angle, the slope angle within each of the surface portions being substantially constant, and adjacent surface portions being distinguished by a difference in the slope angle, wherein the slope angle causes a slope-angle-dependent amount of resistance opposing a movement of the first shifter element, so that the electric current is of a constant magnitude as long as the first shifter element moves within a domain, and the electric current undergoes a change in magnitude when the first shifter element moves across one of the domain boundaries.

61. The transmission of claim 57, wherein the control device receives a primary signal from the primary position-detecting device and a secondary signal from the redundant position-detecting device, wherein both of said signals are indicative of the shift position and wherein the control device evaluates said signals for plausibility.

62. The transmission of claim 61, wherein the control device issues predetermined command signals based on said plausibility evaluation, and wherein said command signals produce at least one of the results of sending a warning, continuing a normal operation of the transmission, and stopping further operation of the motor vehicle.

63. The transmission of claim 37, wherein a forward and backward sense of direction are defined for movements of at least one of the first shifter element and the second shifter element, and wherein the domain boundaries are arranged by taking said sense of direction into account.

64. The control device of the transmission of claim 1, operable to send command signals to the actuator device and thereby causing the actuator device to apply said actuating force according to a predetermined actuating characteristic.

65. A method of operating a motor vehicle, comprising the step of utilizing the transmission of claim 1.

66. A method of operating a motor vehicle, comprising the step of utilizing the control device of claim 64.

67. A method of operating the transmission of claim 37, comprising the steps of:

detecting a position-related signal by means of the redundant position-detecting device, and using the position-related signal for a redundant determination of at least one of the shift position and a shift from one of the transmission ratios to another, wherein the position-related signal comprises a first signal state and a second signal state, and wherein the position-related signal undergoes signal changes from the first to the second signal state when the transmission is in predetermined shift-positions.

68. The method of claim 67, wherein the redundant determination is made on the basis of a characteristic sequence of detecting said first and second signal state and said signal changes.

69. The method of claim 67, wherein the position-related signal correlates with the domains, further comprising the steps of:

a) determining a currently engaged gear level of the transmission;

b) determining a targeted gear level according to a predetermined gear-level characteristic;

c) generating command signals according to an actuator characteristic to actuate at least one of a selector motor and a shifter motor and to thereby direct a shift process from the currently engaged to the targeted gear level;

d) monitoring the position-related signal to determine progress through a characteristic sequence of the domains, said characteristic sequence being specific to the shift process from the currently engaged to the targeted gear level; and e) continuing with steps c) and d) until step d) indicates that the characteristic sequence has been completed.

* * * * *